Nov. 6, 1934.    D. C. KLAUSMEYER ET AL    1,979,474
CARTRIDGE TYPE DRIVE GEAR ASSEMBLY
Filed July 7, 1931    5 Sheets-Sheet 1
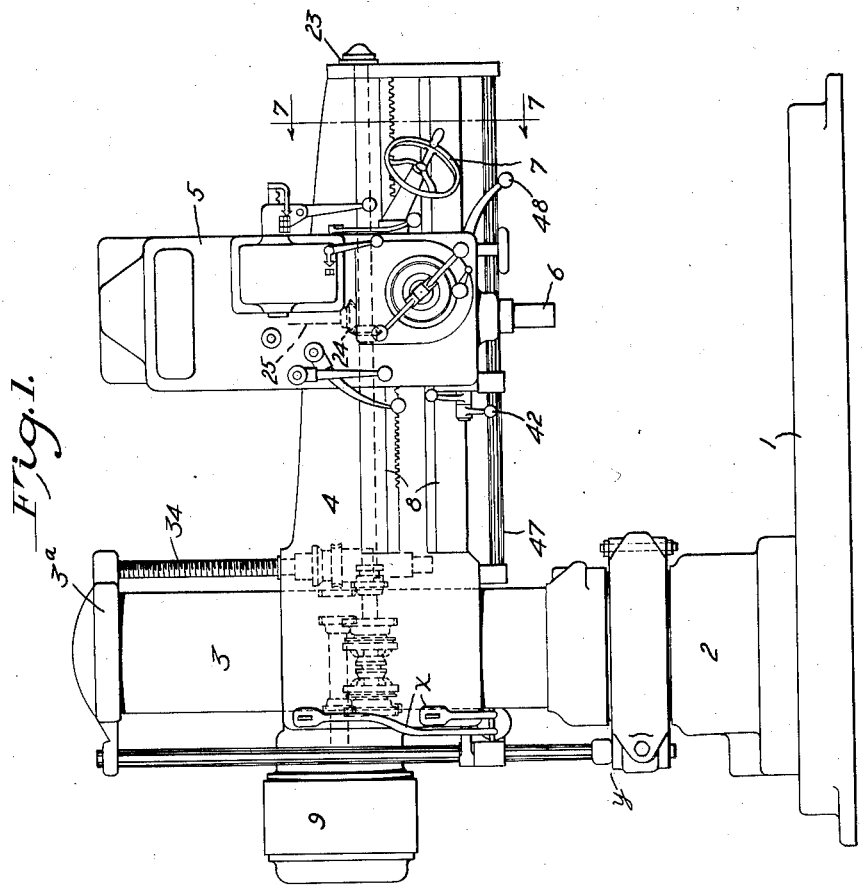
Inventors
DAVID C. KLAUSMEYER
DECEASED
BY H. HENRY SUNDERMANN
EXECUTOR
THOMAS L. GIBSON
By Attorney
Nathan Bowman + Helfrich

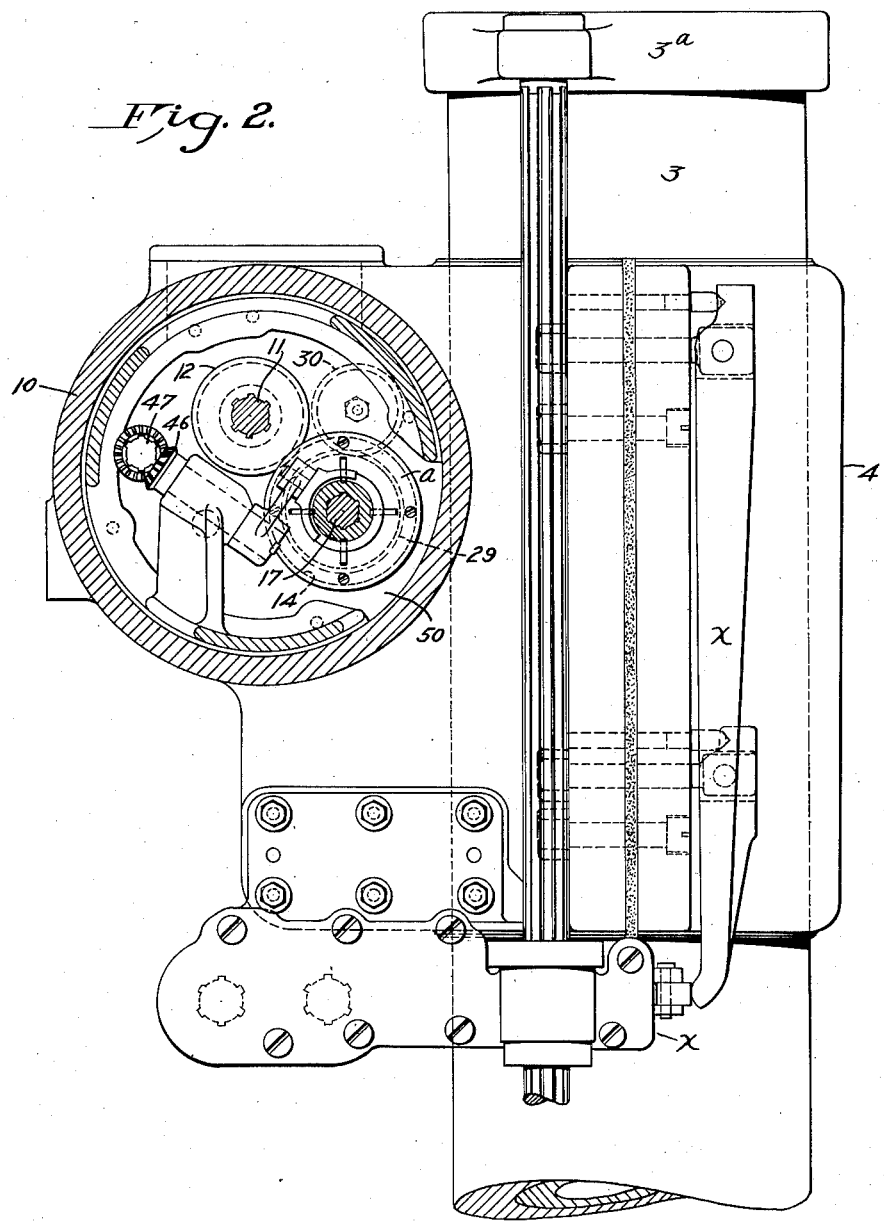

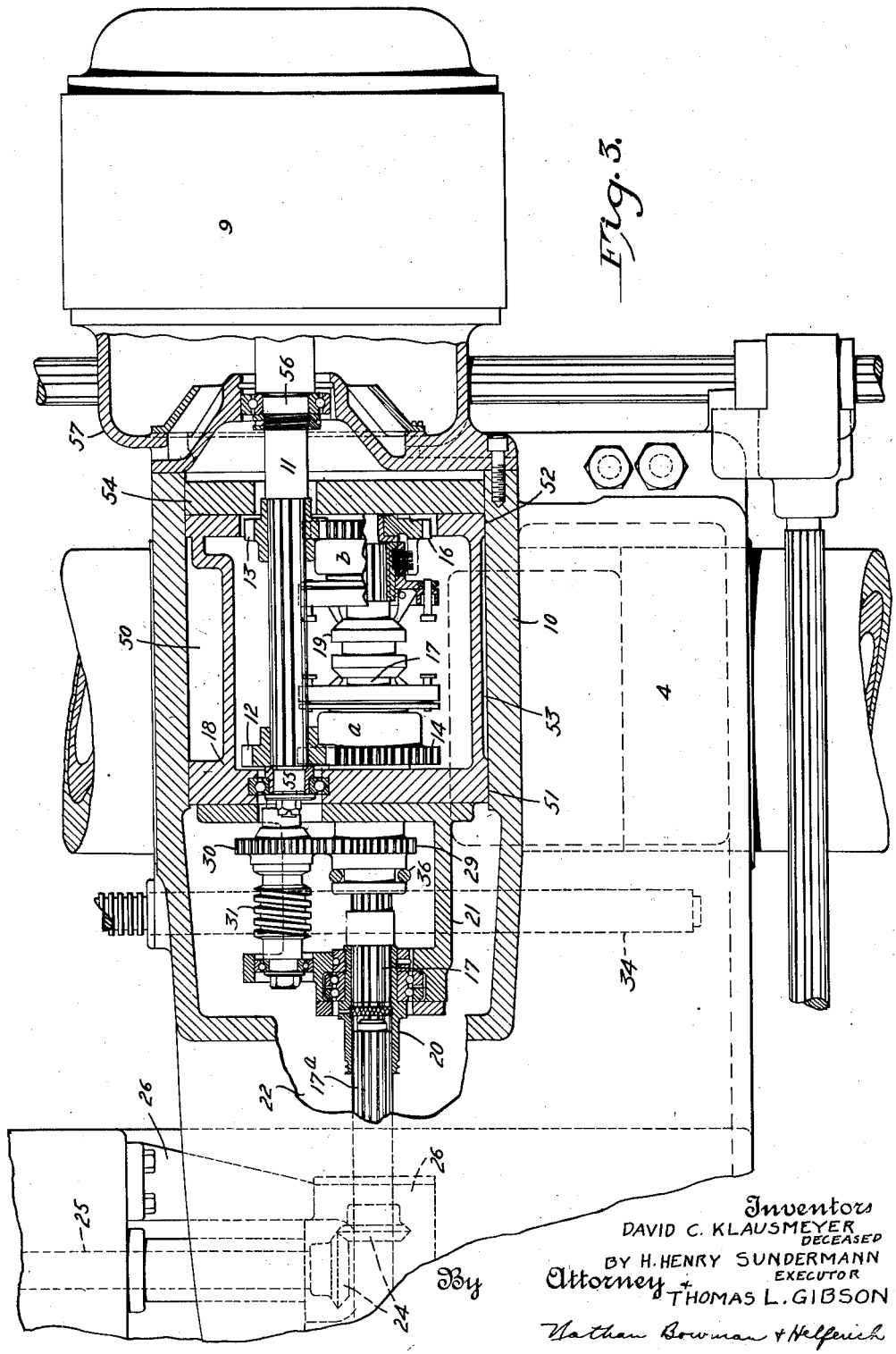

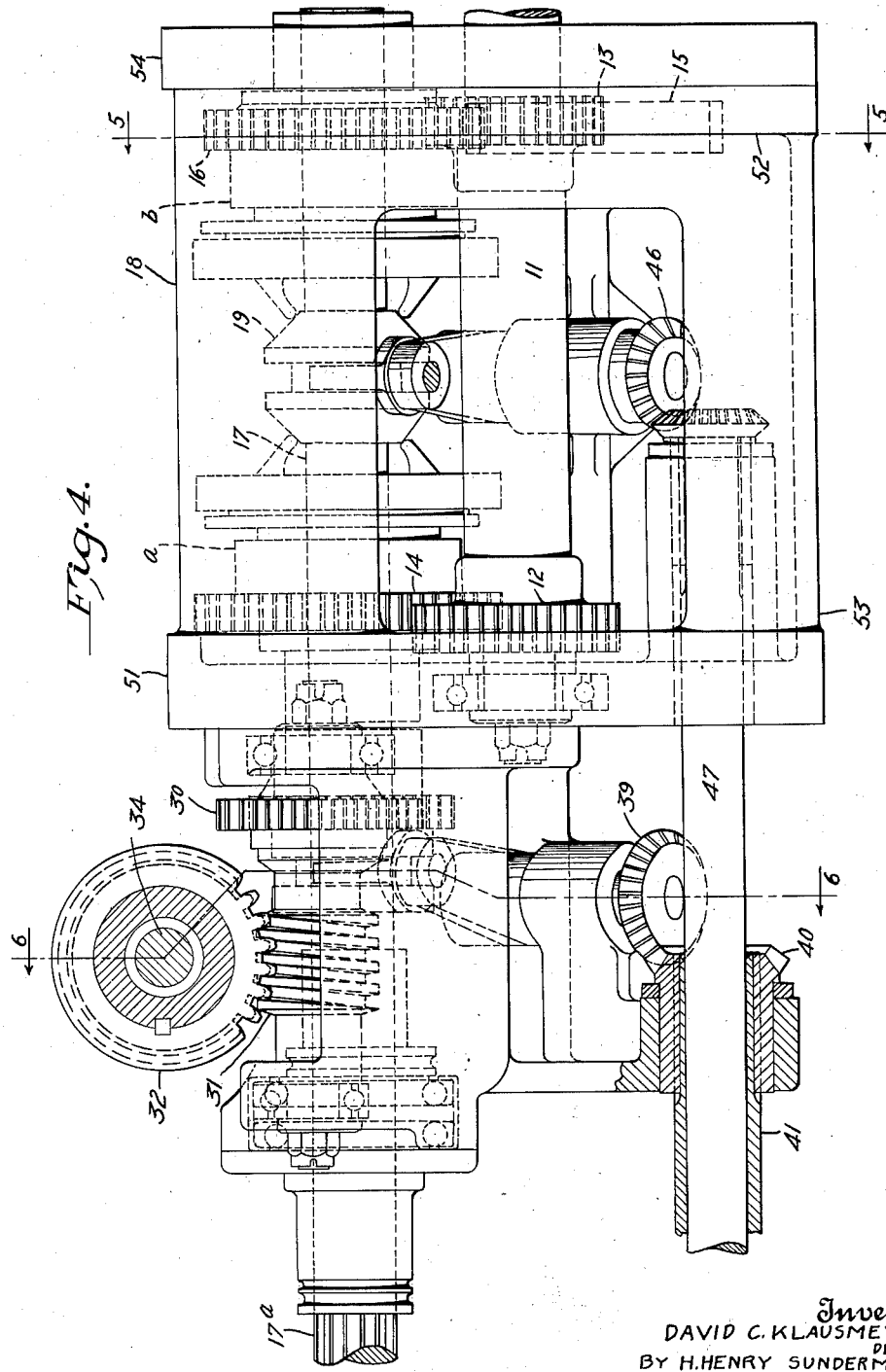

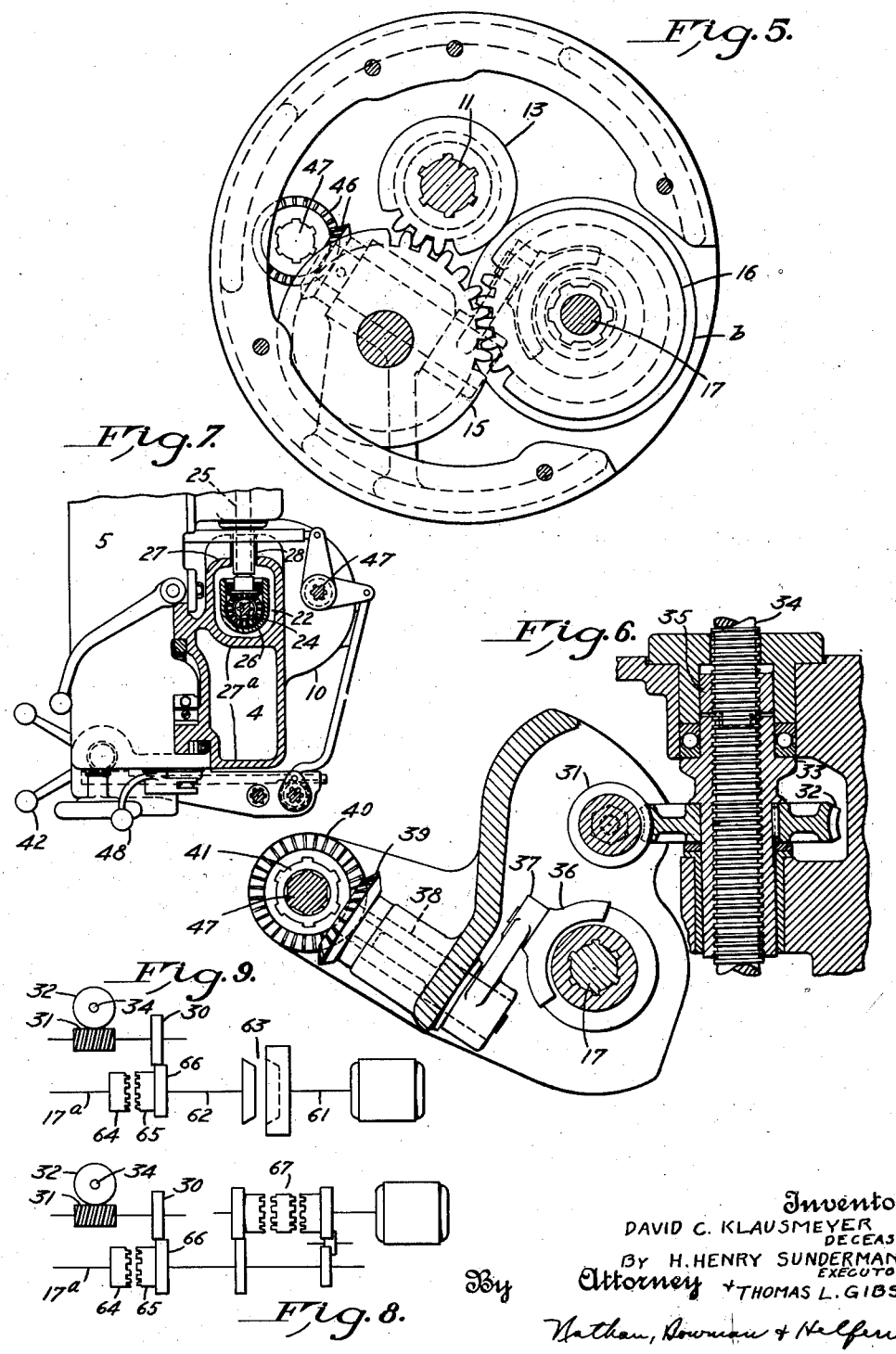

Patented Nov. 6, 1934

1,979,474

UNITED STATES PATENT OFFICE 1,979,474

CARTRIDGE TYPE DRIVE GEAR ASSEMBLY

David C. Klausmeyer, deceased, late of Cincinnati, Ohio, by H. Henry Sundermann, executor, Cincinnati, Ohio, and Thomas L. Gibson, Cincinnati, Ohio, assignors to The Cincinnati Bickford Tool Company, Cincinnati, Ohio, a corporation of Ohio Application July 7, 1931, Serial No. 549,255

15 Claims. (Cl. 77—28)

This invention relates to radial drilling machines and is concerned chiefly with an improvement in the construction of the arm and the mounting of the spindle driving means and arm elevating and lowering means. It has for one of its main objects to enclose all moving parts of the transmission within the frame and thereby to eliminate the necessity of shaft guards and protecting cages that have heretofore been required and, as a refinement thereof, to so construct the respective parts that the entire assembly may be easily and readily assembled or disassembled as separate unitary structures.

A further object of this invention is to arrange the spindle driving mechanism in such a manner that it may be mounted on and carried by the radial arm, preferably at the column end, thereby to reduce the weight to be carried by the unsupported end of the arm and to reduce, to that extent, the forces tending to bind the arm on the column. Heretofore, it has been customary to mount the spindle reversing mechanism in a casing which was carried by and translatable with a drill head. Obviously, the downward turning forces acting upon the arm increase directly as the distance between the head and the column, that is, the further away from the column the drill head is placed, the greater is the force tending to bind the arm on the sleeve and/or the sleeve on the post. Therefore, any weight that can be removed from the arm and placed at the fulcrum point or on the opposite side thereof, will reduce the binding effects and tend to balance the arm. This invention contemplates an arrangement of the parts whereby this excess weight of the drill head has been eliminated therefrom and made a substantial part of the arm, near or adjacent the column. And by so arranging the reversing mechanism in this manner, larger driving gears, shafting bearings and supports therefor, may be utilized better to transmit the power required and to withstand the shocks incident to starting, stopping and reversing of the spindle without affecting, in any manner, the weight upon the overhanging portion of the radial drill arm.

Still another object of this invention is to do away with the reversing of the spindle at the drill head so that the arm shaft, heretofore supported upon the outside of the radial arm, may be carried within the arm and without increasing the cross sectional area thereof or producing any weakening effects upon the structure. For this purpose, a trough of small proportions may be formed in the arm for enclosing the drive shaft and into which a power take-off shaft projects and receives the power for rotating and feeding the drill spindle. Auxiliary shaft guards are not required and an exceptionally strong, rigid and safe machine is produced.

Still another object of this invention is to increase the accuracy of this machine by eliminating therefrom the causes of the vibration which is felt during high spindle speeds. A carboloy, for example, is best machined at high spindle speeds which necessitates in some cases an arm shaft speed of 1000 R. P. M. or over and by placing the reversing mechanism adjacent the trunk-like portion of the machine, instead of out on the limb-like arm, the vibratory effects of high speed drilling is scarcely perceptible.

This invention also proposes to arrange the transmission so that the stresses therein will be distributed more or less equally forwardly and rearwardly of the reversing means. In this way the load upon the deflection of the shafts or the torsional stresses therein will be divided, each branch of the transmission carrying its moiety of the load.

A further concept of this invention is to provide a transmission mechanism for a radial drill wherein there may be employed a single reversing mechanism for changing the direction of rotation in the spindle as well as for reversing the arm translating means. The number of parts required and expense of building the machine is thereby materially reduced while yet providing a simple and effective means for translating the arm in reverse directions and rotating of the spindle in either direction.

Still a further object of this invention is to reduce the complexities of the arm structure and make a more rigid and accurate support for the drill head. To this end there is provided a one-piece arm structure substantially U-shaped in cross-section and having one or more cross ribs connecting the side walls and extending lengthwise of the arm. So that the head may be strongly supported and maintained in perfect alignment, one of the side walls of the arm is provided with the rectangular L-shaped guideways which interlock with complemental guides formed on the drill head. The arm is formed substantially box-like, in cross-section, adequately ribbed and reinforced, and provides open spaces or channels longitudinally arranged for the reception of an enclosure of shafting, gears, etc., thereby eliminating the necessity of auxiliary guarding means and rendering machine more safe and symmetrical in appearance. In addition, the arm is so designed that the upper edge or edges of the side walls are turned inwardly toward the adjacent wall so as to form a cover for the arm shaft located therein, as well as to provide the angular ribbing necessary for increased rigidity of the arm and the prevention of distortion.

For increasing the strength of the arm about the post or support, one of the walls is expanded outwardly and forms a cylindrical bore in which may be inserted driving mechanism for the shaft or shafting located within the arm channels. The enlargement of the arm at the support in this manner adds additional material and greater strength and rigidity to this important part of the machine as well as providing an entirely enclosed housing for the gearing which again eliminates the necessity for auxiliary guarding means or casings.

In this manner there is provided a more compact and sturdy arm which may be easily and accurately machined with but a minimum of expense.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a front elevation of a radial drill incorporating this invention. Fig. 2 is a side view of a portion of the machine, looking toward the column from the side opposite the drill head and illustrating, in sectional form, portions of the driving transmission unit and its mounting. Fig. 3 is a rear view of that portion of the arm adjacent of the column in which is housed the insertable driving unit, the latter being shown in section, better to illustrate in relationship of the parts. Fig. 4 is a plan view of the reversing assembly removed from the arm. Fig. 5 is a sectional view taken substantially along the lines 5—5 of Fig. 4. Fig. 6 is a sectional view taken substantially along the lines 6—6 of Fig. 4 and illustrating portions of the drive to the arm translating mechanism. Fig. 7 is a sectional view through the box-type arm taken along the lines 7—7 of Fig. 1. Fig. 8 is a diagrammatic view of a modified form of the drive means. Fig. 9 is a diagrammatic view representing a further modified form of drive to the arm elevating mechanism.

This invention will be explained and described in connection with the radial drilling machine although it will be understood, however, that it may be embodied in various other machine tools similar, or of a different nature. Referring more particularly to Fig. 1, the radial drill illustrated comprises a base member 1, supporting a post 2 upon which is rotatably mounted a sleeve or column 3. The radial arm 4, translatably mounted on the column 3, carries the usual drill head 5 within which is journaled a translatable and rotatable spindle 6. Under the action of hand wheel 7, the head 5 is propelled toward or away from the column 3 on the L-shaped guideways 8 formed on the radial arm. Clamping mechanisms indicated generally as $x$ and $y$ serve to clamp the arm to the sleeve and the sleeve to the post respectively, but inasmuch as these mechanisms are of conventional form, further description thereof is thought to be unnecessary. A prime mover 9 mounted on the arm, on the side of the column opposite the drill head, provides the power for rotating and feeding the spindle as well as the power for elevating and lowering the arm in the manner hereinafter to be explained.

Referring to Fig. 3, it is to be observed that the motor 9 is of the flanged type and bolted directly to the housing 10 of the arm 4. The motor shaft 11 extends into the housing and has splined thereto gears 12 and 13, constantly in mesh with gears 14 and 15 respectively. The gear 15 is an idler gear which meshes with a gear 16 loosely carried upon a reversible jack shaft 17 journaled in a cylindrical frame 18. The gear 14 is likewise loosely mounted on shaft 17 and either gear is adapted to be clutched thereto as by means of the clutches $a$ and $b$ preferably of the friction disk type. A clutch spool 19, when moved to the left in Fig. 3, operates the clutch $a$ and connects the gear 14 to the jack shaft 17, thereby causing the latter to rotate forwardly. If the clutch spool 19 be shifted to the right, the forward drive gear 14 becomes disengaged from the shaft and clutch $b$ is actuated to engage the gear 16 with the drive shaft. Power from the motor shaft 11 is then transmitted through gears 13, 15, and 16 to the drive shaft, whereby the latter is caused to rotate in the opposite direction. The shaft 17 is splined substantially its entire length and has one end inserted within an internally splined coupling 20 that is rotatably journaled in a member 21 secured to or integral with the frame 18. The coupling 20 is also adapted to receive one end of a splined arm shaft 17ª which is journaled within a channel or trough 22 of the arm 4, in a bearing 23 provided by a plate removably secured to and closing the outer end of the arm. Power from the arm shaft enters the head at the rear thereof by means of a pair of bevel gears 24 and shaft 25 and thence is transmitted through the change speed gearing (not shown), carried in the head, to the spindle 6.

Referring to Fig. 7 it will be observed that the trough 22 need only be large enough to permit its free translation of the bevel gears 24 and the bearing bracket 26 and, therefore, may be formed by the side walls of the arm. The upper portion 27 of the walls of the trough 22 are turned toward each other and thereby form a slot or narrow opening 28 through which the shaft 25 and bearing bracket 26 may project. Rib structures or walls 27ª form the bottom of the trough and there is thus provided a substantially enclosed casing for the arm shaft which does not require additional guarding devices to render the machine safe. The overhanging ledge portions 27 and the walls 27ª of the arm also provide the angular construction and reinforcement necessary to prevent twisting and turning of the arm.

Power to elevate the arm and mechanism carried thereby may also be taken from the reversible arm shaft or from a shaft intermediate the arm shaft and the motor shaft as desired. The drawings illustrate the elevating drive taken directly from the spindle drive and inasmuch as the spindle drive is reversible, as heretofore explained, the elevating mechanism is likewise reversible. The jack shaft 17 has splined thereto a clutch like gear element 29 which is adapted to be brought into engagement with a gear 30 secured to the elevating worm gear 31. With the position of the parts, as shown in Figs. 3 and 6, the clutch gear 29 is arranged in a position to drive the gear 30 to effect rotation of the worm wheel 32 secured to the elevating nut 33. When the clutch gear 29 is moved to the left in Fig. 3, disengaging the gear 30, the drive to the elevating means is suspended.

It will be here mentioned that when the arm is being elevated, the spindle is turning clockwise but moving away from the work because of the elevating of the arm. The converse is true when the arm is being lowered, the spindle and tool are turning counter-clockwise and, therefore, turning backwards even though the head and arm are moving downwardly. Hence, no cutting action can take place during a movement of the arm in either direction.

The elevating screw shaft 34 in this disclosure is normally held stationary in the cap portion 3ª of the sleeve. The nut 33 being rotatably secured in the arm, raises or lowers the arm according to the direction of rotation of the nut. A safety nut 35 is provided to support the weight, and to prevent the arm from dropping, should the screw threads of the elevating mechanism fail. Obviously, the screw shaft 34 may be caused to rotate through a stationary nut if desired.

Shifting of the elevating clutch unit 29 is effected by means of a shifting fork 36 carried by a short lever 37 secured to the shaft 38. The shaft 38 also carries a bevel gear 39 which meshes with a similar gear 40 keyed to a tubular shaft 41. Suitable links and levers connect this tubular shaft with an elevating control lever 42 carried by the drill head. Similar mechanism, such as the shifting fork 43, arm 44, shaft 45 and bevel gears 46, one of which is keyed to the horizontal shaft 47 controls the position of the reversing clutch spool 19. The control shaft 47 extends along the rear of the arm and has a suitable connection with an elevating control lever 48 which is also carried by the head. In this manner the controls for the entire machine are centralized on the head and arranged convenient to the operator.

Referring to Figs. 2 and 3, it will be seen that the arm 4 is enlarged at the column end and provides a cylindrical or tubular opening 50 having the side walls 10 heretofore mentioned. The side walls 10 form the casing or enclosure for the spindle reversing and arm elevating mechanism, as well as provide a reservoir for the lubricant. The inner surface of the walls 10 are preferably formed cylindrically in order to facilitate the machining and aligning of the mechanism and is made such a size as to closely fit the insertable auxiliary frame 18. As hereinbefore stated, the frame 18 is provided with suitable bearings for the support of the various shafts and gears, and is also provided with two spaced bearing portions 51 and 52 which contact with the inner surface of the cylindrical walls 10. Relieving the casing as at 53 provides the necessary raised portions 51 and 52 which may be accurately machined for a sliding fit within the bore 50. A cover plate 54 is removably attached to the casing 18 and provides bearings for the idler gear 15 and one end of the spindle drive shaft 17. The motor shaft 11 extends clear through the cover plate 54 and is journaled at 55 and 56. The bearing 56 is provided with an adapter plate 57, one face of which covers and closes the bore 50 and the other face of which is formed or shaped in a manner to suit the particular motor employed or mounting thereof desired. By making the housing and the cartridge type unit cylindrical so that one fits within the other, extreme accuracy may be obtained in the complete assembly.

It will be noted that this design lends itself readily adaptable to conversion from one type of spindle driving mechanism or arm elevating mechanism to another. The driving unit shown in the drawings may be readily removed and laid aside as a unitary assembly and a driving unit having different gear ratios, change gears, or a modified drive, inserted in its place. For example, Fig. 9 represents diagrammatically a modified form of spindle driving mechanism and arm elevating mechanism which may be inserted. The motor shaft 61 in this modification is connected to a secondary shaft 62 by means of a main clutch indicated generally as 63. The intermediate shaft 62 is adapted to be clutched to the arm shaft 17ª by means of the clutch elements 64 and 65. The clutch element 65 is splined to the shaft 62 and carries a gear 66 which may be meshed with gear 30 of the elevating worm shaft. When the clutch element 65 is in position shown in Fig. 9, the drive to the spindle is suspended and the parts in a position to effect a raising or lowering of the arm. Conversely, when the element 65 is shifted to the left, the elevating drive is suspended and the parts in position to effect rotation of the spindle.

Fig. 8 illustrates a mechanism similar to the one just described, except that a motion reverser indicated generally as 67 takes the place of the clutch 63 and is in this respect similar to the reversing means shown in Figs. 3, 4 and 5. In either of these last two described mechanisms it will be noted that the drive to the spindle is necessarily suspended when the elevating means is operative and that the elevating means is suspended when the drive to the spindle is operative. One user may prefer one form of drive, another user a different form of drive or a plurality of different unitary drives and by so designing the machine that it may be easily and readily converted from one type to another by merely inserting one unit a more flexible and less expensive machine is produced that will cover a wide range of uses.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of United States:—

1. A radial drill combining a support; an arm, substantially rectangular in cross-section, secured to said support and projecting horizontally therefrom; horizontally disposed guideways provided by the forward wall of said arm; a horizontally disposed intermediate wall connecting the forward and rearward walls of said arm and providing, between itself and the upper horizontally disposed wall of the arm, a longitudinally extending chamber, the upper wall of which is provided with a relatively narrow slot; a rotatable arm shaft extending lengthwise through said chamber; a tool head translatably mounted on said guideways; a tool spindle journaled in said head; means carried by said head for rotating said spindle, said means including a driving gear splined to the arm shaft; a driven shaft journaled in said tool head and operatively connected with said spindle, said driven shaft extending through said slot in the arm; and a bearing bracket secured to said tool head and extending through said slot and serving to maintain said driving and driven gears in mesh in all of the positions of said tool head on said arm.

2. A radial drill combining a support; an arm having a girdle portion surrounding said support and provided at one side with an integrally formed housing affording a horizontally disposed cylindrical bore, said arm also comprising a radially projecting portion substantially rectangular in cross-section; an intermediate horizontally disposed wall connecting the forward and rearward walls of said substantially rectangular arm and forming, between itself and the upper wall of the arm, a horizontally disposed chamber which connects at one end with said cylindrical bore; a tool head mounted on said arm; a spindle in said tool head; an arm shaft journaled in said arm and extending lengthwise through said chamber; a driving connection between said arm shaft and said spindle including a shaft journaled in said tool head and extending through a relatively narrow slot in the upper wall of said arm above said chamber, and gear connections between the last mentioned shaft and said arm shaft located within said chamber; a driving motor secured to said arm adjacent the rearward end of said cylindrical bore and having its shaft projecting into said bore, and a driving unit removably secured within said cylindrical bore and forming a driving connection between said motor and said arm shaft.

3. A radial drill combining a tool head; a tool spindle rotatably journaled therein; an arm for supporting said tool head, said arm having formed integrally with it a housing provided with a cylindrical bore; a spindle driving shaft extending lengthwise of said arm; a spindle drive motor secured to said arm; and a reversible driving unit connecting the motor shaft and said spindle drive shaft, said unit comprising a frame member removably secured within said bore; a jack shaft journaled in said frame member; an operative connection between said jack shaft and said spindle driving shaft; and a reversible driving connection between said jack shaft and the motor shaft, said frame member, jack shaft and driving connections being removable from said bore as a unitary structure.

4. A radial drill combining a column; an arm translatably carried thereby; a tool head supported upon said arm; a spindle journaled in said head; driving means for said spindle including an arm shaft; a driving motor carried by said arm and having its shaft extending horizontally into said arm; a driving unit removably secured in said arm independently of the mounting of said arm on said column and comprising a frame; a jack shaft, connected with the arm shaft, journaled in said frame and adapted to be driven from the motor shaft; a reversible drive between said motor shaft and said jack shaft; and arm translating means arranged to receive power selectively in forward and reverse directions from one of said shafts.

5. A radial drill combining a column member; an arm translatably mounted thereon; a driving unit removably mounted within a chamber in said arm; a tool head mounted on said arm and provided with a rotatable tool spindle; a motor mounted on said arm and having a drive shaft projecting into said driving unit; mechanism for translating said arm on said column; means for driving said spindle including said motor shaft, a first driven shaft journaled in said driving unit and rotated selectively in forward and reverse directions from said motor shaft and a second driven shaft aligned with and driven from said second shaft, all of said shafts being journaled lengthwise of said arm; and means for actuating said arm translating means from one of said driven shafts.

6. A radial drill combining a support; an arm translatably mounted thereon, said arm being formed adjacent said support with a housing providing a horizontally disposed bore; means for translating said arm on said support; an arm shaft journaled lengthwise of said arm and terminating at its rearward end adjacent to said bore; a driving motor secured to said arm in alignment with said bore and having its shaft extending thereinto; and a self-contained driving unit including a forward and a reverse drive removably secured within said bore and adapted to be removed therefrom as a unit, said driving unit serving to rotate said arm shaft and the arm translating means from said motor shaft through said forward and reverse drives.

7. A radial drill combining a support; an arm mounted thereon, said arm being formed adjacent said support with a housing providing a bore; an arm shaft journaled lengthwise of said arm and terminating at its rearward end adjacent to said bore; a driving motor secured to said arm in alignment with said bore and having its shaft extending thereinto; and a self-contained driving unit fitted within said housing for rotating said arm shaft from said motor shaft, said driving unit comprising a frame conforming to and fitted within said bore, a jack shaft journaled in said frame and operatively connected with said arm shaft, and a gear connection between said jack shaft and said motor shaft.

8. A radial drill combining a support; an arm mounted thereon, said arm being formed adjacent said support with a housing providing a bore; a tool head on said arm; an arm shaft journaled lengthwise of said arm and terminating at its rearward end adjacent to said bore; a driving motor secured to said arm in alignment with said bore and having its shaft extending thereinto; and a self-contained driving unit removably secured within said housing and comprising a frame, a jack shaft journaled in said frame and operatively connected with said arm shaft, a forward and a reverse drive between said motor shaft and said jack shaft, and means including a control element on said tool head selectively to render effective either of said drives.

9. A radial drill as set forth in claim 8 in which the drive unit also includes a clutch device for selectively rendering effective the forward and reverse drives, and means for actuating said clutch device.

10. A radial drilling machine combining a support; an arm translatably mounted thereon and provided adjacent said support with an integrally formed housing having a chamber formed therein; a tool head carried by said arm; a tool spindle in said tool head; means including a relatively rotatable screw and nut for translating said arm on said support; means including a shaft extending lengthwise of said arm for rotating said spindle; a driving motor for said translating means and said spindle secured upon said arm and having its shaft extending into said chamber; and a self-contained driving and reversing unit removably secured within said chamber and adapted selectively to connect said motor with said spindle drive and said arm translating means.

11. An arm for a radial drill comprising a vertically arranged girdle and a substantially rectangular box-like portion projecting horizontally therefrom and comprising integrally formed horizontally disposed upper and lower walls, vertically disposed front and rear walls and a horizontally disposed inner wall connecting the front and rear walls and dividing the arm longitudinally into upper and lower horizontally disposed chambers, of which the former extends to the free end of the arm and is adapted to house a longitudinally disposed drive shaft, the upper wall of said arm being provided with a relatively narrow longitudinally disposed slot the width of which is not materially greater than the diameter of the drive shaft; and a member removably secured to the free end of said arm to form a closure for the open end of said upper chamber.

12. An arm for a radial drill comprising a portion adapted to be slidingly secured upon a column; a box-like portion projecting therefrom and comprising relatively narrow upper and lower horizontally disposed walls and relatively wide front and rear vertically disposed walls, all of said walls being integral and constituting a substantially rectangular body providing a chamber extending to the free end thereof and adapted to house a drive shaft; guideways formed on said front wall adapted to slidingly support a toolhead; said upper wall being provided, substantially centrally of the arm, with a relatively narrow slot adapted to permit the passage of a portion of a driving connection from said drive shaft to said tool head, said driving connection also including gears, the diameter of which is greater than the width of said slot; and a cover plate secured to the free end of said arm to close said chamber, said plate being removable to permit the elements of said driving connection to be inserted into said chamber.

13. A radial drilling machine combining a box-like arm of substantially rectangular cross-section the width of which is approximately one-half the depth thereof, said arm being made of integrally formed unbroken vertically disposed side walls, a horizontally disposed bottom wall connecting said side walls, an inwardly projecting flange formed at the upper edge of each side wall, and an intermediate wall connecting said side walls, said flanges terminating short of the center of the arm and affording between them a longitudinally extending slot the width of which is approximately the width of one of said flanges, said walls and flanges affording a substantially closed casing; guideways formed on one of said side walls; a tool-head translatably mounted on said guideways; a tool spindle rotatably journaled therein; a drive shaft journaled lengthwise within said substantially closed casing and guarded solely thereby; and a shaft extending from said tool-head through said slot and forming a part of driving connection from said drive shaft to said spindle in all of the positions of said tool-head on said arm.

14. An arm for a radial drill comprising a portion adapted to be secured to a column; a substantially rectangular box-like portion projecting therefrom and comprising upper and lower longitudinally disposed walls and front and rear walls formed integral with the first mentioned walls, said upper wall being provided with a relatively narrow longitudinally extending slot; a third longitudinally disposed wall integrally connecting said front and rear walls, said third wall being located intermediate said upper and lower walls and dividing said arm into two longitudinally extending chambers arranged one above the other the upper of said chambers being adapted to house a transmission shaft from which power may be taken by a driving connection extending through said slot; and guideways formed on one of said side walls adjacent said lower and intermediate walls, said guideways being adapted to translatably support a tool-head, said lower and intermediate walls serving to transmit to the other of said side walls a portion of the stresses imposed upon the side wall which provides said guideways.

15. An arm for a radial drill comprising a portion adapted to be slidingly secured upon a column; an elongated box-like portion projecting therefrom and comprising integrally formed top, bottom, front and rear walls and a horizontally disposed inner wall connecting the front and rear walls, said inner wall dividing the arm longitudinally into upper and lower horizontally disposed chambers the upper of which is adapted to house a longitudinally disposed drive shaft, said top wall being provided with a relatively narrow longitudinally disposed slot the width of which is not materially greater than the diameter of said drive shaft; and guideways formed on the front wall of said arm to support a tool head thereon, said slot being adapted to permit the passage of a portion of a driving connection from said drive shaft to said tool head.

H. HENRY SUNDERMANN,
*Executor of the Last Will and Testament of David C. Klausmeyer, Deceased.*

THOMAS L. GIBSON.